July 30, 1963 G. MADELUNG 3,099,422

TILTABLE POD FOR JET POWER UNITS ON AIRCRAFT

Filed Oct. 31, 1960

G. MADELUNG
Inventor

By Moore & Hall
Attorneys

United States Patent Office 3,099,422
Patented July 30, 1963

3,099,422
TILTABLE POD FOR JET POWER UNITS ON AIRCRAFT
Gero Madelung, Munich, Germany, assignor to Messerschmitt AG, Augsburg, Germany, a company of Germany
Filed Oct. 31, 1960, Ser. No. 66,201
Claims priority, application Germany Oct. 30, 1959
4 Claims. (Cl. 244—23)

This invention relates to a tiltable pod for jet power units on aircraft.

In connection with the provision of tiltable power units for VTOL or STOL jet-propelled aircraft the following problem arises which the invention seeks to solve. For safety reasons it is an advantage to combine two or more engine units in a single engine pod. If one of two engines combined in a pod fails, the thrust will not drop to zero but will be only halved. Moreover, the thrust required for propelling VTOL or STOL aircraft which cruise at low altitudes is very much lower than that required for starting and landing, so that for cruising speed the engines must be considerably throttled. Specific fuel consumption is therefore substantially increased.

Consequently, it is an advantage in VTOL or STOL aircraft especially when cruising at low altitudes if one of the engines contained in each pod can be shut down after take-off.

However, if this is done, the resulting less satisfactory intake conditions (only half the air volume being required when two engines are combined in one pod) and the continued flow of air through the engine which has been stopped will increase the drag. This must be prevented.

The solution to the problem achieved in accordance with the present invention is described hereinafter, and is illustrated in the accompanying drawings, in which.

Figure 1:
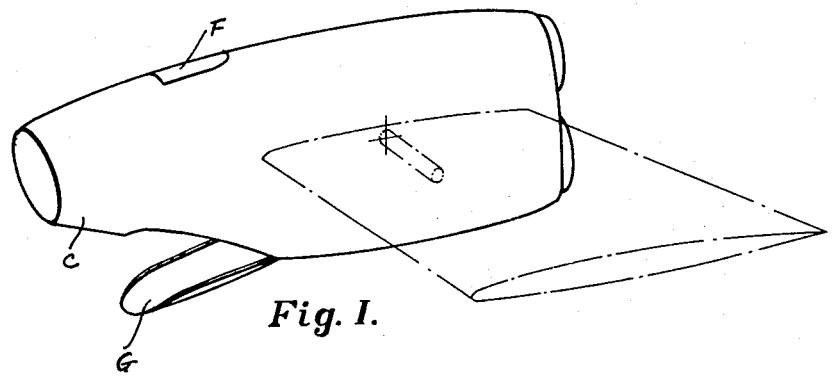
FIGURE 1 is a perspective view illustrating the disposition of a tiltable pod constructed in accordance with the present invention, in relation to an aircraft wing, shown in phantom.
Figure 2:
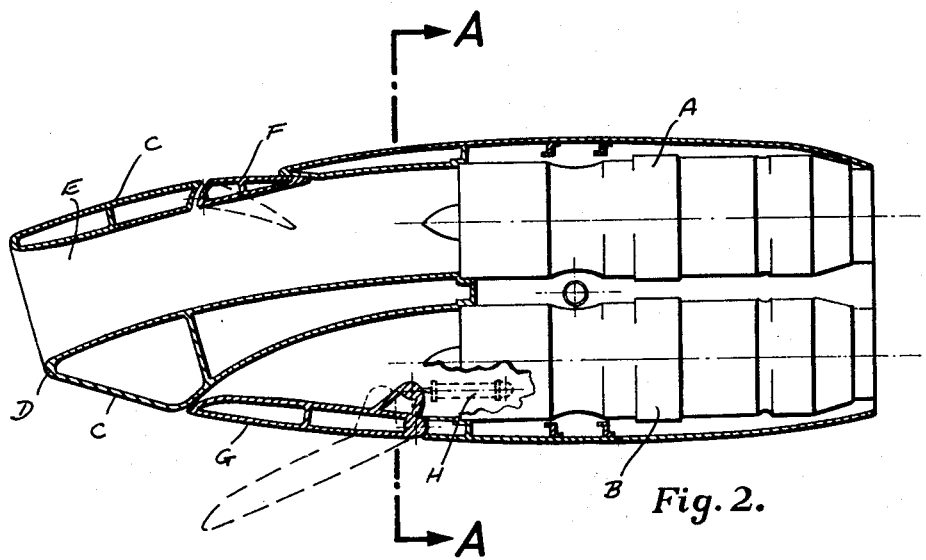
FIGURE 2 is a side view in partial section of a tiltable jet power unit constructed in accordance with the present invention.
Figure 3:
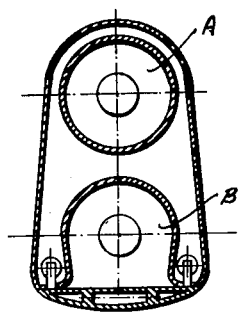
FIGURE 3 is a cross-sectional view taken on line A—A of FIGURE 2.

As shown in the accompanying drawing the invention provides a tilting engine pod which contains two or more jet propulsion units A and B with an external intake C of a shape which ensures the necessary air intake for engine A at cruising speed. From the entry edge D an internal duct E leads to engine A. For starting and landing, additional air intakes F are provided for this engine unit.

According to the invention the intake of the second engine unit (or further engine units) is closed at cruising speed by one or more flaps G which, when closed, by an operator H, align with the external smooth surface of the pod without permitting a significant volume of air to flow through this engine.

I claim:

1. A tiltable jet power unit for VTOL or STOL aircraft, comprising a pair of superposed engines disposed within a single pod, said pod being pivotally mounted on the aircraft and pivotal between generally vertical and generally horizontal positions, one of said engines being adapted for use primarily during cruising operations of said aircraft and the other of said engines being adapted primarily for use, in cooperation with said one engine, during take-off and landing operations, said other engine being further adapted to be rendered effectively inoperative during normal cruising operations, an external air intake at one end of said pod adapted to provide a volume of air required by said one engine at cruising speed, an internal duct in said pod leading from said intake to said one engine, air intake means in a side wall of said pod communicating with said duct for providing a controllable supplementary air supply to said one engine for take-off and landing operations, and further air intake means in a further side wall of said pod communicating with the other one of said pair of engines for supplying air only to said other engine during said take-off and landing operations, said further air intake means including flap means adapted upon closure to effect an external smooth substantially streamlined shape to said further side wall of said pod while simultaneously preventing any significant flow of air to said other engine when said other engine is rendered effectively inoperative during cruising operations of said aircraft.

2. In a VTOL or STOL aircraft, a power unit comprising an elongated pod mounted on said aircraft for pivotal movement between generally vertical and generally horizontal positions, said pod having external walls of smooth generally streamlined configuration, a pair of jet engines disposed in stacked relation within said pod, said pair of engines providing a pair of jet outlets disposed in stacked relation to one another at one end of said pod, an air intake at the other end of said pod, wall means within said pod forming a duct leading from said air intake to one of said engines and isolating air flowing through said intake from the other of said engines, a further air intake in a side wall of said pod leading to said other engine, and flap means disposed adjacent said further air intake and adapted to be selectively opened and closed thereby to selectively permit and prevent air flow via the side wall of said pod to said other engine, said flap means being shaped to effect a smooth substantially streamlined external shape to the side wall of said pod in the region of said further air intake upon closure of said flap means.

3. A jet power unit for an aircraft comprising a pod mounted on said aircraft for pivotal movement between substantially vertical and horizontal positions, a pair of jet engines mounted within said pod, each of said engines having a jet outlet communicating with one end of said pod, air inlet means leading from the other end of said pod to only one of said engines, said air inlet means being dimensioned to always provide air flow to said one engine at a rate sufficient to permit cruising of said aircraft with said one engine, further air intake means in a side wall of said pod leading to the other one of said engines, said other engine being primarily adapted for use only during take-off and landing of said aircraft, and flap means adapted to close said further air intake thereby to prevent the flow of any significant amount of air to said other engine under operating conditions other than aircraft landing and take-off, said flap means being adapted to effect a smooth substantially unbroken streamlined configuration to the side wall of said pod in the region of said further air intake upon closure of said flap means.

4. The unit of claim 3 including still further air intake means in a side wall of said pod for supplementing the air supplied via said air inlet means to said one engine during take-off and landing of said aircraft.

References Cited in the file of this patent
UNITED STATES PATENTS

| | | |
|---|---|---|
| 2,696,078 | Waitzman | Dec. 7, 1954 |
| 2,699,906 | Lee | Jan. 18, 1955 |
| 3,023,981 | Reiniger | Mar. 6, 1962 |

FOREIGN PATENTS

| | | |
|---|---|---|
| 788,290 | Great Britain | Dec. 23, 1957 |
| 1,068,999 | Germany | Nov. 13, 1959 |